United States Patent [19]

Dolch et al.

[11] 4,145,327

[45] Mar. 20, 1979

[54] PRESSURE-SENSITIVE ANTISTATIC ADHESIVE AND PROCESS FOR THE PREPARATION THEREOF USING AN AQUEOUS LATEX COPOLYMER AND A QUATERNARY AMMONIUM SALT

[75] Inventors: Ronald G. Dolch, Budd Lake, N.J.; Robert N. Kerr, Jr., Reading, Pa.

[73] Assignee: The Firestone Tire & Rubber Company, Akron, Ohio

[21] Appl. No.: 866,974

[22] Filed: Jan. 5, 1978

[51] Int. Cl.$^2$ .............................................. C08L 33/08
[52] U.S. Cl. ...................... 260/29.6 MN; 260/29.6 N; 260/DIG. 20
[58] Field of Search ................. 260/29.6 MN, 29.6 N, 260/DIG. 20

[56] References Cited

U.S. PATENT DOCUMENTS

| | | | |
|---|---|---|---|
| 2,626,876 | 1/1953 | Carnes | 260/DIG. 20 |
| 3,146,882 | 9/1964 | Wallner et al. | 428/334 |
| 3,347,362 | 10/1967 | Rabuse et al. | 428/194 |
| 3,470,267 | 9/1969 | Litt et al. | 260/887 |
| 3,498,816 | 3/1970 | Winch et al. | 260/29.6 MN |

*Primary Examiner*—M. J. Welsh

[57] ABSTRACT

Disclosed is a novel antistatic pressure-sensitive adhesive composition essentially comprising an aqueous latex copolymer of a vinyl ester and an alkyl acrylate to which an adhesive-compatible ammonium salt has been added. An antistatic pressure-sensitive adhesive is prepared by dispersing, as an antistatic promoter, a compatible ammonium salt, such as a quaternary ammonium salt, directly with the latex copolymer. By coating one side of a suitable release paper with the antistatic pressure-sensitive adhesive thus prepared and thereafter laminating the adhesive side of the coated release paper to a film material, the tendency for such materials to accumulate electrostatic charges upon the removal of the release paper is greatly reduced.

6 Claims, No Drawings

PRESSURE-SENSITIVE ANTISTATIC ADHESIVE AND PROCESS FOR THE PREPARATION THEREOF USING AN AQUEOUS LATEX COPOLYMER AND A QUATERNARY AMMONIUM SALT

BACKGROUND OF THE INVENTION

The present invention is directed toward a pressure-sensitive antistatic adhesive composition and a process for the preparation of film covering materials carrying the adhesive. In the manufacture of wall coverings and shelf liners, comprising vinyl films and the like, it is known to apply pressure-sensitive adhesive materials as a backing, covered by a sheet of silicone-treated release paper which, when removed, exposes the adhesive surface for contact with the wall or other substrate upon which the film is to be adhered.

Among the commonly employed pressure-sensitive adhesive compositions for this purpose are the copolymers of the lower acrylic esters and vinyl monomers, particularly vinyl acetate. Removal of the protective paper from the adhesive causes an accumulation of electrostatic charges thereon which makes subsequent application of the film difficult in that it will prematurely adhere to materials carrying an opposite charge or resist contact with other materials of like charge.

DESCRIPTION OF THE PRIOR ART

In order to reduce the tendency of adhesives to collect electrostatic charges, the addition of certain ingredients to the adhesive composition has been proposed and likewise, various methods for coating the adhesive-carrying material to resist the accumulation of static charges are known. One such additive and method for reducing antistatic charges is disclosed in U.S. Pat. No. 3,146,882, wherein pressure-sensitive adhesive tape is provided with a thin antistatic primer coating between the film, cellulose acetate, and the adhesive layer. The primer disclosed is a polymer compounded so as to have substantial electrical conductivity. Preferred polymers are ionizable organic salts having a hydrocarbon backbone and attached salt groups and include sodium salts of sulfonated polymers and quaternary polymer salts such as dimethylaminoethyl methacrylate. In support of the effectiveness of their primer coating, the patentees state that incorporation of an antistatic agent in the adhesive composition will produce an inferior adhesive.

U.S. Pat. No. 3,470,267 discloses the application of polyoxazines to the surface of a material as well as their incorporation in certain materials to increase the antistatic properties of the material. The materials so treated include synthetics such as nylon, rayon, acrylics, polyester fibers, and the like as well as natural materials such as hard rubber, amber and wool.

Another U.S. Pat. No. 3,347,362, discloses the reduction of electrostatic charges on certain adhesive tapes by coating the edges of the tape with a quaternary ammonium compound. The coating material preferably employed for this purpose is stearamidopropyldimethyl-β-hydroxyethylammonium nitrate and is applied to the edges of the tape at the time that it is sliced from larger width rolls. U.S. Pat. No. 2,626,876 also discloses the use of certain quaternary ammonium compounds as a coating material for vinyl resin articles to reduce accumulation of static charges therein, however, the articles are not provided with a pressure-sensitive adhesive.

Despite the disclosures in the aforementioned prior art directed toward reducing static charges on various articles, it has not been known to us to incorporate an effective antistatic agent directly into the adhesive formulation prior to use as a coating. From a processing standpoint, it is advantageous to apply a single coating of the pressure-sensitive adhesive which is also antistatic; such a process is less time consuming and costly than having to apply an antistatic layer in a separate, additional step as taught in the prior art. To be effective, we have discovered that the antistatic agent must be compatible with the adhesive not only to prevent separation and/or degradation, but also to permit a sufficient amount of the antistatic agent, or antistat, to be incorporated to reduce or prevent formation of a charge when the film is being applied.

SUMMARY OF THE INVENTION

It is therefore an object of the present invention to provide an adhesive-compatible additive to a pressure-sensitive adhesive which will improve the antistatic quality of the adhesive.

It is another object of the present invention to provide a pressure-sensitive adhesive backed wall covering product having a low static quality thereby facilitating its application to substrates.

It is yet another object of the present invention to provide a pressure-sensitive adhesive which can tolerate the addition of an antistatic additive.

It is a further object of the present invention to provide an antistatic pressure-sensitive adhesive that can be applied directly to wall coverings and the like without the addition of separate primers, topcoats or antistat coatings.

It is still a further object of the present invention to provide a process for the preparation of an antistatic pressure-sensitive adhesive wherein the compatible antistat is uniformly dispersed within the selected pressure-sensitive adhesive formulation prior to the application of the latter to the product.

These and other objects of the present invention shall become apparent from the specification and claims which follow.

In general, the novel antistatic pressure-sensitive adhesive composition of the present invention essentially comprises an aqueous latex copolymer of a vinyl ester such as vinyl acetate and an alkyl acrylate such as 2-ethylhexyl acrylate or butyl acrylate to which an adhesive-compatible ammonium salt, such as a quaternary ammonium salt, has been added. The preferred salt is stearamidopropyldimethyl-β-hydroxyethylammonium nitrate and is present in an amount of from about 0.5 to 5.0 parts per hundred parts of the latex copolymer. The antistatic pressure-sensitive adhesive of the present invention is prepared by dispersing the quaternary ammonium salt directly with the latex copolymer. This composition can then be utilized as an adhesive backing for various film materials by coating one side of a suitable release paper and thereafter laminating the adhesive side of the coated release paper to the film material.

DESCRIPTION OF THE PREFERRED EMBODIMENT

The antistatic pressure-sensitive adhesive of the present invention can be applied to a variety of products including wall coverings, shelf liners and others, having decorative and protective uses. Such products generally comprise poly-vinyl chloride films although other materials such as polyolefins, paper, fabric, polyester, saran or other plastic films can be employed. The vinyl film is prepared in a known manner and is printed or otherwise processed to produce a decorative surface for display when the film is applied to the substrate.

To illustrate our invention, we have prepared an aqueous latex pressure-sensitive adhesive polymer composition comprising a copolymer of a vinyl ester and an alkyl acrylate. Emulsifying systems are preferably non-ionic although anionic systems and mixtures of the two can be employed. It is to be understood that while a pressure-sensitive adhesive formulation is provided herein, selection thereof is not particularly critical to the practice of the invention. An additional adhesive which we have discovered to be compatible with the antistatic additive of the present invention is a water-based latex pressure-sensitive adhesive such as PSA-42M, manufactured by Stein-Hall, a division of Celanese Coatings and Specialties Co.

Suitable acrylates have the formula:

wherein R is an alkyl radical having at least 4 carbon atoms, and suitable vinyl esters have the formula:

wherein $R_1$ is an alkyl radical having from 1 to 5 carbon atoms. These compounds are generally disclosed in U.S. Pat. No. 3,268,357, to which reference may be made. Preferred compounds we have employed successfully are vinyl acetate comprising from about 0 to 60% by weight of the composition and 2-ethylhexyl acrylate or butyl acrylate comprising from about 40 to 100% by weight of the composition.

In Example I, the formulation for a pressure-sensitive adhesive, prepared with a nonionic emulsifier, is given. Examples II and III are similar copolymer formulations utilizing anionic and a mixed anionic-nonionic emulsifying system, respectively. The procedure followed in each of the examples involved charging the initial components to a three neck 1000 ml. flask equipped with an agitator and dispersing all the components in the water at a temperature of 70° C. Polymerization of the monomers was conducted under a continuous atmosphere of nitrogen. The components which were continuously added were premixed and added over a period of 3–4½ hours utilizing a dropping funnel with adjustable stopcock. Temperature was maintained at 70° C. for the final addition the temperature was raised to 90° C. for one hour. Physical properties of the adhesives are given in Table I.

The following examples are representative and illustrate the results achieved in the practice of our invention.

EXAMPLE I:

| Component | Total Recipe | Initial Charge | Continuous Addition Over 4½-Hr. Period | Addition at 5 Hrs. |
|---|---|---|---|---|
| Vinyl acetate (VAc) | 50 | 7.5 | 42.5 | — |
| 2 Ethylhexyl acrylate (2-EHA) | 50 | 7.5 | 42.5 | — |
| Potassium Persulfate | 0.5 | 0.1 | 0.3 | 0.1 |
| Sodium Bicarbonate | 0.25 | 0.25 | — | — |
| Igepal CO-630* | 2 | 1 | 1 | — |
| Igepal CO-880** | 4 | 2 | 2 | — |
| Cellosize WP-09*** | 1.5 | 1.5 | — | — |
| Water | 150 | 80 | 65 | 5 |

*nonyl phenoxy poly(ethylene oxy) ethanol - 65% ethylene oxide (GAF Corp.)
**nonyl phenoxy poly(ethylene oxy) ethanol - 86% ethylene oxide (GAF Corp.)
***low viscosity grade hydroxy ethyl cellulose - Union Carbide

EXAMPLE II:

| Component | Total Recipe | Initial Charge | Continuous Addition Over 4½-Hr. Period | Addition at 5 Hrs. |
|---|---|---|---|---|
| VAc | 40 | 6 | 34 | — |
| 2-EHA | 60 | 9 | 51 | — |
| Potassium Persulfate | 0.45 | 0.15 | 0.25 | 0.05 |
| Sodium Bicarbonate | 0.25 | 0.25 | — | — |
| Aerosol OT* | 1.5 | 1.0 | 0.5 | — |
| Aerosol MA** | 1.5 | — | 1.5 | — |
| Cellosize WP-09 | 1.5 | 1.5 | — | — |
| Water | 150 | 80 | 50 | 15 |

*dioctyl sulfosuccinate - American Cyanamid
**hexyl sulfosuccinate diester - American Cyanamid

EXAMPLE III:

| Component | Total Recipe | Initial Charge | Continuous Addition Over 3-Hr. Period | Addition at 4 Hrs. |
|---|---|---|---|---|
| VAc | 40 | 6 | 34 | — |
| 2-EHA | 60 | 9 | 51 | — |
| Potassium Persulfate | 0.45 | 0.15 | 0.3 | — |
| Sodium Bicarbonate | 0.25 | 0.25 | — | — |
| Aerosol OT (75%) | 2 | 1 | 1 | — |
| Triton X405* | 4 | — | 3 | 1 |
| Cellosize WP-09 | 1.5 | 1.5 | — | — |
| Water | 145 | 80 | 50 | 15 |

*ethoxylated octyl phenol (40 moles ethylene oxide) Rohm & Haas

TABLE I

|  | Example I | Example II | Example III |
|---|---|---|---|
| % Solids | 41% | 37% | 40% |
| % Conversion | 97% | 88% | 95% |
| pH | 4.7 | 4.7 | 4.4 |
| Viscosity (cps) Brookfield - 60 rpm | 65 | 140 | 95 |
| Surface Tension (dynes) | 36.4 | 28.2 | 34.3 |

To 100 parts of each of the examles was added 2.5 parts by weight of our preferred antistatic additive, stearamidopropyldimethyl-β-hydroxyethylammonium nitrate under very slow agitation with an air mixer for approximately one hour. Although this compound has been found by us to be satisfactory as an antistat in terms of compatibility with the pressure-sensitive adhesives disclosed and reduction of static charges, other quaternary ammonium compounds such as those disclosed in U.S. Pat. No. 3,347,362 can also be employed by those skilled in the art to achieve substantially the same results. Similarly, the amount of the antistat employed can be varied from about 0.5 to 5.0 parts per 100 parts of the adhesive with satisfactory results.

Following the addition of the antistatic agent, each of the three examples was stored for two weeks after which the viscosity was again measured to determine if thickening had occurred. For example I, no increase in viscosity was observed. For example II, immediate coagulation of the latex was observed upon addition of the antistat. Another sample was tested by treatment with 2.8 parts by weight of a nonionic post stabilizer, Triton X405 (per 100 parts of solids) prior to the addition of the antistat and found to be stable with minimal viscosity increase after two weeks. For example III, a viscosity increase from 95 cps to 195 cps was observed. Thus, it can be concluded that the antistat is most stable in a totally nonionically emulsified latex.

Application of the antistatic pressure-sensitive adhesive to the vinyl film can be performed, for example, with a ruling mill engraved cylinder of either 95 or 59 line engraving. The adhesive is transferred from the rotating cylinder to a silicone treated Kraft paper passing under pressure between the cylinder and a rubber backup roller. The adhesive coated release paper was thereafter traversed at 100 yards per minute through a hot air oven at a temperature of 194° C. The dried, adhesive-coated paper was subsequently laminated to a PVC film and slit into appropriate widths.

The preceding examples can be varied within the context of our total specification disclosure as it would be understood and practiced by one skilled in the art to achieve substantially the same results with a minimum of routine experimentation.

The improved antistatic qualities of the adhesive-backed vinyl film described herein were readily observable by stripping the backing (silicone coated Kraft paper) away from the adhesive coated film and bringing it toward the substrate to which it will be adhered. For a normal pressure-sensitive adhesive coated product, i.e., one in which the adhesive-compatible ammonium salt disclosed herein has not been dispersed within the adhesive formulation, a static charge, caused by the stripping of the release paper will be retained by the vinyl film and cause an undesirable attraction to the substrate. However, the antistatic adhesive composition described herein dissipates the static charge and produces a film which is readily and conveniently applicable to the desired substrate.

A test was run in which normal, or untreated, pressure-sensitive adhesive coated film products were compared with film products coated with the antistatic adhesive formulation of the present invention to determine the distance each could be brought to a painted wall without attraction. The release paper was stripped from the film of each sample and the film was slowly moved toward the wall. Attraction between the untreated adhesive coated product and the wall occurred at six inches, whereas the product treated with the antistatic adhesive composition of the present invention was first attracted to the wall at a distance of only one inch.

Thus, it can be seen that the disclosed invention carries out the objects of the invention set forth above. As will be apparent to those skilled in the art, the composition of the antistatic pressure-sensitive adhesive can be varied by the selection of the various ingredients as well as the amounts thereof in order to optimize the desired antistatic properties while maintaining the desired compatibility between the pressure-sensitive adhesive formulation and the ammonium salt, and it is believed that the preparation and use of this composition can be determined without departing from the spirit of the invention herein disclosed and described, the scope of the invention being limited solely by the scope of the attached claims.

We claim:

1. A novel pressure-sensitive adhesive composition having improved antistatic properties comprising:
   an aqueous latex copolymer having
   from about 30 to about 60 parts by weight of vinyl acetate per 100 parts of said latex copolymer; and,
   from about 40 to about 70 parts by weight of an acrylate selected from the group consisting of 2-ethylhexyl acrylate and butyl acrylate per 100 parts of said latex copolymer;
   from about 0.5 to about 5.0 parts by weight of an adhesive-compatible quaternary ammonium salt, per 100 parts of said latex copolymer, incorporated therein; and,
   from about 2 to about 4 parts by weight of a nonionic emulsifier per 100 parts of said latex copolymer.

2. A novel pressure-sensitive adhesive composition as set forth in claim 1, wherein said nonionic emulsifier is an alkylaryl polyoxyethylene compound.

3. A novel pressure-sensitive adhesive composition as set forth in claim 1, wherein said quaternary ammonium salt is stearamidopropyldimethyl-$\beta$-hydroxyethylammonium nitrate and is present in an amount of 2.5 parts per 100 parts of said latex copolymer.

4. A process for the preparation of an antistatic pressure-sensitive adhesive comprising the step of:
   dispersing an adhesive-compatible quaternary ammonium salt;
   a nonionic emulsifier; and,
   an aqueous latex adhesive comprising
   from about 30 to about 60 parts by weight of vinyl acetate per 100 parts of said latex copolymer; and,
   from about 40 to about 70 parts by weight of an acrylate selected from the group consisting of 2-ethylhexyl acrylate and butyl acrylate per 100 parts of said latex copolymer to form the antistatic pressure-sensitive adhesive.

5. A process for the preparation of an antistatic pressure-sensitive adhesive as set forth in claim 4, wherein said nonionic emulsifier is an alkylaryl polyoxyethylene compound.

6. A process for the preparation of an antistatic pressure-sensitive adhesive, as set forth in claim 4, wherein said quaternary ammonium salt is stearamidopropyldimethyl-$\beta$-hydroxyethylammonium nitrate and is present in an amount of 5 parts per 100 parts of said latex copolymer.

* * * * *